(12) United States Patent
Vejlgaard et al.

(10) Patent No.: US 12,074,650 B2
(45) Date of Patent: Aug. 27, 2024

(54) INTERFERENCE MANAGEMENT FOR MEASUREMENTS GAP

(71) Applicant: Nokia Technologies Oy, Espoo (FI)

(72) Inventors: Benny Vejlgaard, Gistrup (DK); Alessio Marcone, Munich (DE)

(73) Assignee: Nokia Technologies Oy, Espoo (FI)

( * ) Notice: Subject to any disclaimer, the term of this patent is extended or adjusted under 35 U.S.C. 154(b) by 128 days.

(21) Appl. No.: 17/854,426

(22) Filed: Jun. 30, 2022

(65) Prior Publication Data
US 2023/0009653 A1 Jan. 12, 2023

(30) Foreign Application Priority Data

Jul. 9, 2021 (EP) .................................. 21184651

(51) Int. Cl.
*H04B 17/13* (2015.01)
*H04B 7/06* (2006.01)
*H04B 17/12* (2015.01)
*H04B 17/318* (2015.01)

(52) U.S. Cl.
CPC .......... *H04B 17/13* (2015.01); *H04B 7/0617* (2013.01); *H04B 17/12* (2015.01); *H04B 17/318* (2015.01)

(58) Field of Classification Search
CPC .......... H01Q 21/28; H01Q 1/246; H01Q 3/24; H01Q 21/29; H01Q 3/36; H01Q 3/26; H01Q 3/08; H01Q 21/065; H04B 17/13; H04B 7/0617; H04B 17/12; H04B 17/318; H04B 7/088; H04B 17/14; H04B 17/24; H03F 1/3241; H03F 3/19; H03F 3/21; H04W 24/02; H04W 24/08
See application file for complete search history.

(56) References Cited

U.S. PATENT DOCUMENTS

| | | | |
|---|---|---|---|
| 2010/0093282 A1* | 4/2010 | Martikkala | H04B 17/21 |
| | | | 455/63.4 |
| 2019/0222326 A1* | 7/2019 | Dunworth | H04B 17/13 |

OTHER PUBLICATIONS

Intel Corporation, "On performance improvements from self-calibration in UL gaps", 3GPP TSG-RAN WG4 Meeting #97-e, R4-2014590, Nov. 2-Nov. 13, 2020.
Tervo, N. et al., "Digital Predistortion of Phased-Array Transmitter With Shared Feedback and Far-Field Calibration", IEEE Transactions on Microwave Theory and Techniques, Jan. 1, 2021, vol. 69, No. 1.

* cited by examiner

*Primary Examiner* — David E Lotter
(74) *Attorney, Agent, or Firm* — Harrington & Smith

(57) ABSTRACT

Interference management in calibration of a pre-distorter for a power amplifier of a user device. The method includes measuring strength of signals received via beams of one or more antenna arrays of a user equipment; ordering the beams on the basis of the measurement strengths; selecting from the ordered beams at least one beam for calibration of a pre-distorter for a power amplifier of the user equipment; obtaining information of available measurement resources for the calibration; transmitting a calibration signal using the selected beam at the time of the available measurement resources; receiving the calibration signal by another radio frequency chain of the antenna array which is not used in the transmission of the calibration signal; obtaining calibration information on the basis of the transmitted calibration signal and the received calibration signal; and calibrating the pre-distorter based on the calibration information.

20 Claims, 13 Drawing Sheets

Configuration 1: AM/PM then AM/AM

Configuration 2: AM/AM then AM/PM

INTERFERENCE MANAGEMENT FOR MEASUREMENTS GAP

TECHNICAL FIELD

The present disclosure relates to a method, an apparatus and a computer program product for interference management in calibration of a power amplifier of a user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Power amplifiers are central components in the overall performance and throughput of communication systems, but they are inherently nonlinear. The nonlinearity may generate spectral re-growth, which may lead to adjacent channel interference and violations of the out-of-band emissions standards mandated by regulatory bodies. It may also cause in-band distortion, which may degrade an error vector magnitude and ultimately a bit-error rate (BER) and data throughput of the communication system.

To reduce the nonlinearity, the power amplifier can be operated at lower power (that is, "backed off") so that it operates within the linear portion of its operating curve. However, newer transmission formats, such as wideband code division multiple access (WCDMA) and orthogonal frequency division multiplexing (OFDM, WLAN/3GPP LTE & 5G NR), have high peak-to-average power ratios (PAPR); that is, large fluctuations in their signal envelopes. This means that the power amplifier needs to be backed off well below its maximum saturated output power in order to handle infrequent peaks, which result in very low efficiencies (typically less than 10%). With greater than 90% of the DC power being lost and turning into heat, the amplifier performance, reliability and ongoing operating expenses (OPEX) are all degraded.

FIG. 1 illustrates an example situation in which a user equipment UE 2 may be allowed to occasionally perform a calibration operation to calibrate the power amplifier (PA) and possibly also other parts of transmitter components of the UE 2. However, at the same time a another user equipment UE 1 may be in an RRC connected mode and communicates with the network via a base station gNB 1. The calibration operation of the user equipment UE 2 may thus disturb the communication between the other user equipment UE 1 and the base station gNB 1.

In some communication systems a user equipment in a connected mode may perform power amplifier calibration (UL PA calibration) by sending in an uplink (UL) slot a calibration signal. This procedure may be repeated at intervals. The user equipment may need to receive information from a network base station (e.g. gNB) whether the user equipment is allowed to send the calibration signal and when it is allowed to do that. When doing the power amplifier calibration, UE may transmit signals on only one Tx chain and idles the other Tx chain(s) within selected slots. Two Tx chains may be alternatively calibrated in time. When doing power amplifier calibration within selected UL slots, the user equipment uses resource assignments in UL grants, and follows power control procedure.

When a user equipment is performing the UL power amplifier calibration with high bandwidth and high transmit (TX) power some unnecessary interference may be induced in the cell. Hence, the problem is to avoid or minimize any interference and blocking at the gNB caused by the UE UL power amplifier calibration gap.

SUMMARY

Some embodiments provide a method for interference management for measurement gaps, in calibration of a power amplifier of a user device. In some embodiments the method comprises measuring strength of signals received via a plurality of beams of one or more antenna arrays of a user equipment; ordering the beams on the basis of the measurement strengths; selecting from the ordered beams one or more beams for calibration of a pre-distorter for a power amplifier of the user equipment; obtaining information of an available measurement slot for the calibration; transmitting a calibration signal by the power amplifier using the selected beam at the time of the available measurement slot; receiving the calibration signal by another beam of the antenna array which is not used in the transmission of the calibration signal; obtaining calibration information on the basis of the transmitted calibration signal and the received calibration signal; and calibrating the power amplifier based on the calibration information.

According to some embodiments of the disclosure a user equipment is connected in a Radio Resource Control (RRC) connected mode during the UL PA calibration gap. Thus, the user equipment is aligned with a narrow beam towards the serving gNB following the 3GPP beam alignment procedures. In accordance with an embodiment, the UE is granted UL PA calibration gap regularly, for example once in every 100 ms. The user equipment will for one or more slots transmit a wideband and high power TX calibration sequence for estimating the DPD coefficients. This signal may create interference to received signal of other UEs at the serving gNB as it does not fulfil the UL power control limits but rather transmits at full power to estimate the non-linearities of the power amplifier.

To alleviate this interference and blockage the following procedure may be performed:

The user equipment estimates during the RRC connected mode the received signal power, e.g. from a received signal strength indication (RSSI) in all available beam directions of the user equipment (UE code book entries).

The user equipment ranks the power of the beam directions (UE code book entries) from low to high.

The user equipment requests UL PA measurement resources gNB grants the user equipment UL PA measurement resources The user equipment will use the code book entry (beam direction) which has the lowest RSSI estimate during the UL PA calibration slot.

The procedure may minimize the interference and blockage done in the system as the calibration signal is transmitted in the direction of the least interference, possibly away from the gNB. The reason for using RSSI as the metric for selecting the transmitting beam is to avoid interference and blockage not only to the serving cell but also to neighbour cells of the same or even a different network. RSSI indeed includes contribution of co-channel and adjacent channel interference.

In accordance with an embodiment of the disclosure, the UE TX signal is captured by the user equipment itself using another branch of a multiple input multiple output (MIMO) antenna array of the user equipment, thus the far-field directivity of the signal is not important for the scope of self-calibration.

In accordance with an embodiment of the disclosure, the UE TX signal captured by the user equipment is a near field signal, therefore the setting of phase shifters before the power amplifier have no impact on the useful signal for self-calibration. However the far-field signal may minimize any interference in the network.

In other words, the user equipment scans the direction (UE TX codebook entry) with the least power/interference and uses this direction for transmitter power amplifier self-calibration. The solution works as the interference, if any, is caused by the far field signal and the calibration only uses the near field signal.

In accordance with an embodiment of the disclosure, the user equipment and gNB can exchange information on the UE codebook used during UL power amplifier calibration.

Various aspects of examples of the invention are provided in the detailed description.

According to a first aspect, there is provided a method comprising:
measuring strength of signals received via a plurality of beams of one or more antenna arrays of a user equipment;
ordering the beams on the basis of the measurement strengths;
selecting from the ordered beams at least one beam for calibration of a pre-distorter for a power amplifier of the user equipment;
obtaining information of available measurement resources for the calibration;
transmitting a calibration signal by the power amplifier using the selected beam at the time of the available measurement resources;
receiving the calibration signal by another radio frequency chain of the antenna array which is not used in the transmission of the calibration signal;
obtaining calibration information on the basis of the transmitted calibration signal and the received calibration signal; and
calibrating the pre-distorter based on the calibration information.

According to a second aspect, there is provided an apparatus comprising:
means for measuring strength of signals received via a plurality of beams of one or more antenna arrays of a user equipment;
means for ordering the beams on the basis of the measurement strengths;
means for selecting from the ordered beams at least one beam for calibration of a pre-distorter for a power amplifier of the user equipment;
means for obtaining information of available measurement resources for the calibration;
means for transmitting a calibration signal by the power amplifier using the selected beam at the time of the available measurement resources;
means for receiving the calibration signal by another radio frequency chain of the antenna array which is not used in the transmission of the calibration signal;
means for obtaining calibration information on the basis of the transmitted calibration signal and the received calibration signal; and
means for calibrating the pre-distorter based on the calibration information.

According to a third aspect, there is provided an apparatus comprising at least one processor; and at least one memory including computer program code the at least one memory and the computer program code configured to, with the at least one processor, cause the apparatus to perform at least the following:
measure strength of signals received via a plurality of beams of one or more antenna arrays of a user equipment;
order the beams on the basis of the measurement strengths;
select from the ordered beams at least one beam for calibration of a pre-distorter for a power amplifier of the user equipment;
obtain information of available measurement resources for the calibration;
transmit a calibration signal by the power amplifier using the selected beam at the time of the available measurement resources;
receive the calibration signal by another beam of the antenna array which is not used in the transmission of the calibration signal;
obtain calibration information on the basis of the transmitted calibration signal and the received calibration signal; and
calibrate the pre-distorter based on the calibration information.

According to a fourth aspect, there is provided a computer program product comprising computer readable program code which, when executed by at least one processor; cause the apparatus to perform at least the following:
measure strength of signals received via a plurality of beams of one or more antenna arrays of a user equipment;
order the beams on the basis of the measurement strengths;
select from the ordered beams at least one beam for calibration of a pre-distorter for a power amplifier of the user equipment;
obtain information of available measurement resources for the calibration;
transmit a calibration signal by the power amplifier using the selected beam at the time of the available measurement resources;
receive the calibration signal by another radio frequency chain of the antenna array which is not used in the transmission of the calibration signal;
obtain calibration information on the basis of the transmitted calibration signal and the received calibration signal; and
calibrate the pre-distorter based on the calibration information.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following description and drawings are illustrative and are not to be considered as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" or "some embodiments" means that a particular feature, structure, or characteristic described in connection with the embodiment is included in at least one embodiment of the disclosure. In several locations, this does not necessarily mean that each such reference is to the same embodiment(s), or that the feature only applies to a single embodiment. Single features of different embodiments may also be combined to provide other embodiments.

Figure 1:
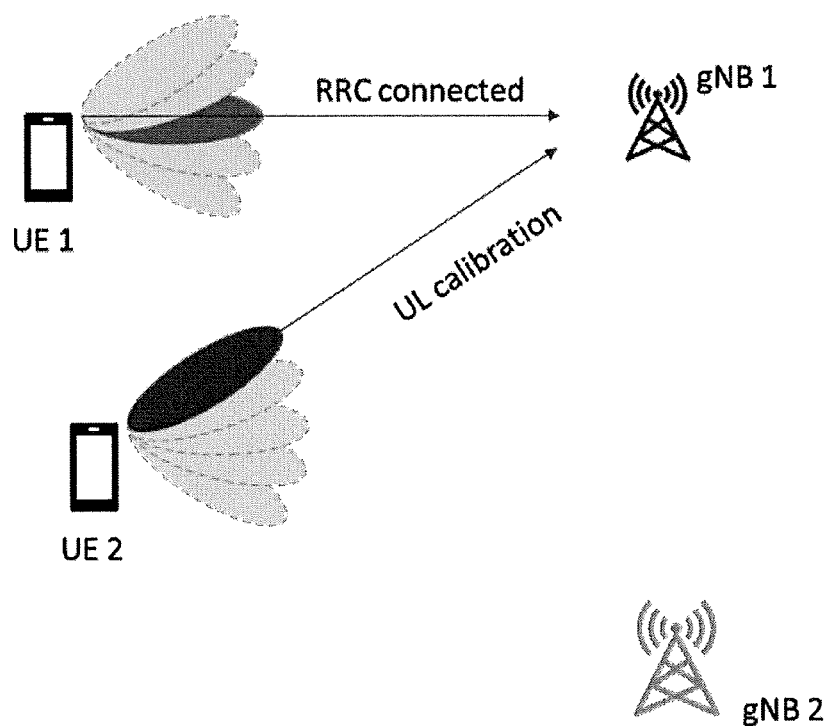
FIG. 1 illustrates an example situation in which a user equipment performing calibration operation of a power amplifier interferes communication between another user equipment and a base station.
Figure 2A:
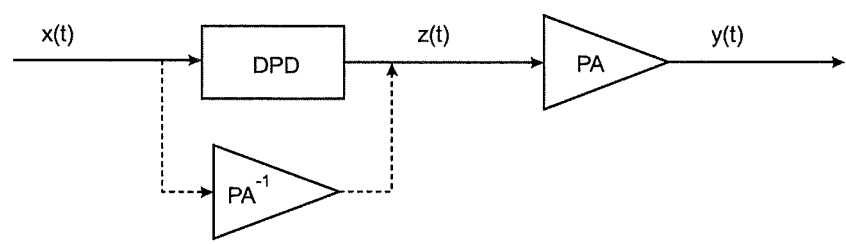
FIG. 2a illustrates a digital pre-distortion concept.
Figure 2B:
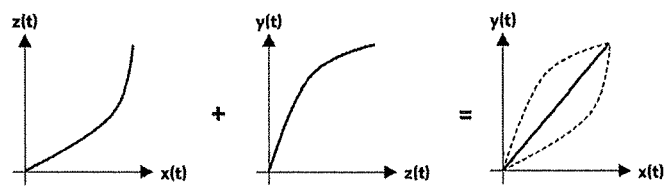
FIG. 2b illustrates how a digital pre-distorter-power amplifier cascade may linearize non-linearity of the power amplifier.

Digital Pre-Distortion concept (DPD) is one of the most cost-effective linearization techniques. According to some approaches, an excellent linearization capability may be obtained, which may be traded for enhanced efficiency, and it may take full advantage of advances in digital signal processors and A/D converters. The technique adds an expanding nonlinearity in the baseband that complements the compressing characteristic of the RF power amplifier (FIG. 2a). Ideally, the cascade of the pre-distorter and the power amplifier becomes linear and the original input is amplified by a constant gain. With the pre-distorter, the power amplifier can be utilized up to its saturation point while still maintaining good linearity. This may be used to increase the transmitter output power capability for a given linearity target, or may be used to increase the efficiency of the transmitter at a given backed off output power by re-biasing for lower saturation point. From FIG. 2a, the DPD can be seen as an "inverse" of the PA. The DPD algorithm needs to model the PA behavior accurately and efficiently for successful DPD deployment. FIG. 2b illustrates how the DPD-PA cascade linearizes the non-linearity of the power amplifier. x(t) is the incoming signal, z(t) is the output of the DPD and y(t) is the output of the power amplifier.

According to some other approaches the pre-distortion compensation may be performed in the IF section (intermediate frequency) of a transmitter wherein the compensated signal is upconverted to the final radio frequency band to be transmitted.

According to yet some other approaches the pre-distortion compensation may be performed in the RF section of a transmitter wherein the compensated signal is directly in the final radio frequency band to be transmitted.

DPD implementations can be classified into memoryless models and models with memory.

Memoryless models focus on the power amplifier that has a memoryless nonlinearity, that is, the current output depends only on the current input through a nonlinear mechanism. This instantaneous non-linearity is usually characterized by the AM/AM and AM/PM responses of the power amplifier, where the output signal amplitude and phase deviation of the power amplifier output are given as functions of the amplitude of its current input. Both memoryless polynomial algorithm and Look-Up Table (LUT) based algorithm are two key algorithms for memoryless models.

Figure 3A:
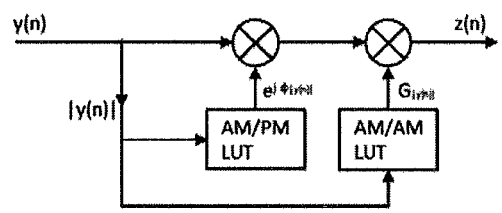
FIGS. 3a and 3b show an example of a structure of applying a look-up table.
Figure 3B:
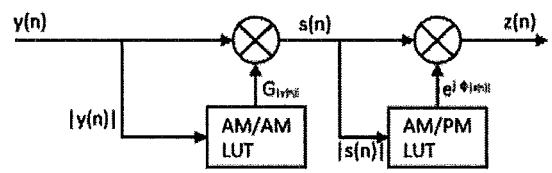

FIG. 3a and FIG. 3b show the structure of applying the Look-up Table. There are two configurations according to the order of AM/AM and AM/PM.

For the first configuration (AM/PM then AM/AM) illustrated in FIG. 3a, the input amplitude values for AM/PM LUT and AM/AM LUT are the same. For the second configuration (AM/AM then AM/PM) illustrated in FIG. 3b, the input amplitude values for AM/AM LUT and AM/PM LUT are different.

Memory model is commonly used as the signal bandwidth gets wider, such as in WCDMA, mobile WiMAX and 3GPP LTE and LTE-Advanced (up to 100 MHz bandwidth, 5 component carriers of carrier aggregation) and 5G NR with bandwidth up to 2×400 MHz or higher for frequencies greater than 52.6 GHz. For wider bandwidth, power amplifiers begin to exhibit memory effects. Causes of the memory effects can be attributed to thermal constants of the active devices or components in the biasing network that have frequency dependent behaviors. As a result, the current output of the power amplifier depends not only on the current input, but also on the past input values. In other words, the power amplifier becomes a nonlinear system with memory. For such a power amplifier, memoryless predistortion can achieve only very limited linearization performance. Therefore, digital pre-distorters must have memory structures.

One algorithm for models with memory for Digital pre-distortion implementation is Volterra series and its derivatives. One general way to introduce memory is to use the Volterra series. However, the large number of coefficients of the Volterra series makes it unattractive for practical applications. Therefore, there are several Volterra's derivatives including Wiener, Hammerstein, Wiener-Hammerstein, parallel Wiener structures, and memory polynomial model, which are popular in digital pre-distorters. The so-called "memory polynomial" is interpreted as a special case of a generalized Hammerstein model and is further elaborated by combining with the Wiener model.

To construct digital pre-distorters with memory structures, there are two types of approaches. One type of approach is to first identify the power amplifier and then find the inverse of the power amplifier directly. This approach is named as direct learning architecture (DLA). However, obtaining the inverse of a nonlinear system with memory is generally a difficult task. Another type of approach is to use the indirect learning architecture (IDLA) to design the pre-distorter directly. The advantage of this type of approach is that it eliminates the need for model assumption and parameter estimation of the power amplifier.

Figure 4:
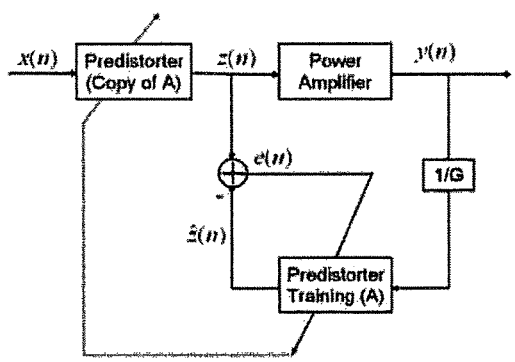
FIG. 4 illustrates an example of indirect learning architecture for the digital pre-distorter.

The indirect learning architecture for the digital pre-distorter is shown in FIG. 4.

Figure 6:
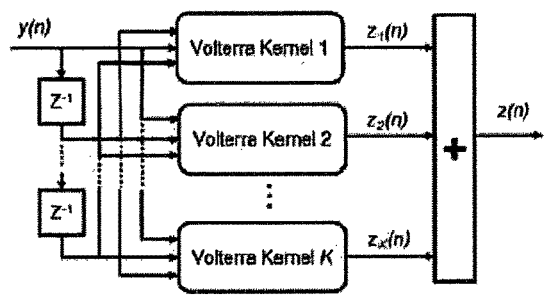
FIG. 6 shows an example of a Volterra series structure.
Figure 5:
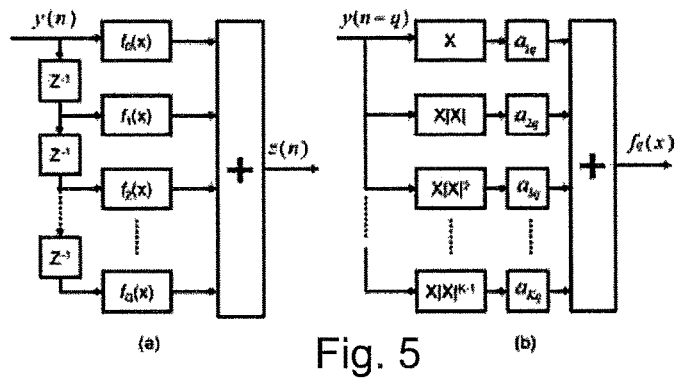
FIG. 5 shows an example of a memory polynomial structure.

FIG. 5 shows an example of a memory polynomial structure. If Q=0, the structure in FIG. 5 becomes memoryless polynomial, and the Volterra series structure is shown in FIG. 6.

In some approaches, DPD coefficients are calculated during UE production. For low bandwidth <100 MHz, one solution is done using feedback receivers on silicon while for larger bandwidths (e.g. 5G NR mmWave) external measurement equipment may be needed to capture the required bandwidth and the effect of the active antenna module.

A solution for sub 6 GHz with limited bandwidth <100 MHz is to transmit a known reference signal in the UE factory. A build in feedback receiver can capture the transmitted signal with bandwidth up to three times the transmitted signal bandwidth and then transfer the signal back to the baseband for calculation of the (m)DPD coefficients. The solution works as long as the performance does not change due to aging or external environment effects in the field or sufficient power back off is incorporated to absorb the environment effects maintaining specification compliance.

Solutions for application with higher bandwidth and mmWave support may require an external test box.

For mmWave and large bandwidths (>100 Mhz), the transmitted signal is captured radiated using external test equipment on the factory floor. The external test equipment can capture the transmitted signal with bandwidth up to three times the transmitted signal bandwidth and then transfer the signal back to the baseband for calculation of the (m)DPD coefficients. However, loading effects may change during live operation in the field and thus the (m)DPD coefficients would need to change dynamically and the available static set of coefficients might become invalid. Using an architecture as for sub 6 GHz may not be possible as it may not be possible to capture very large bandwidths with required dynamic range online during operation and thus the antenna loading effects will not be captured appropriately in the feedback receiver signals.

Figure 7:
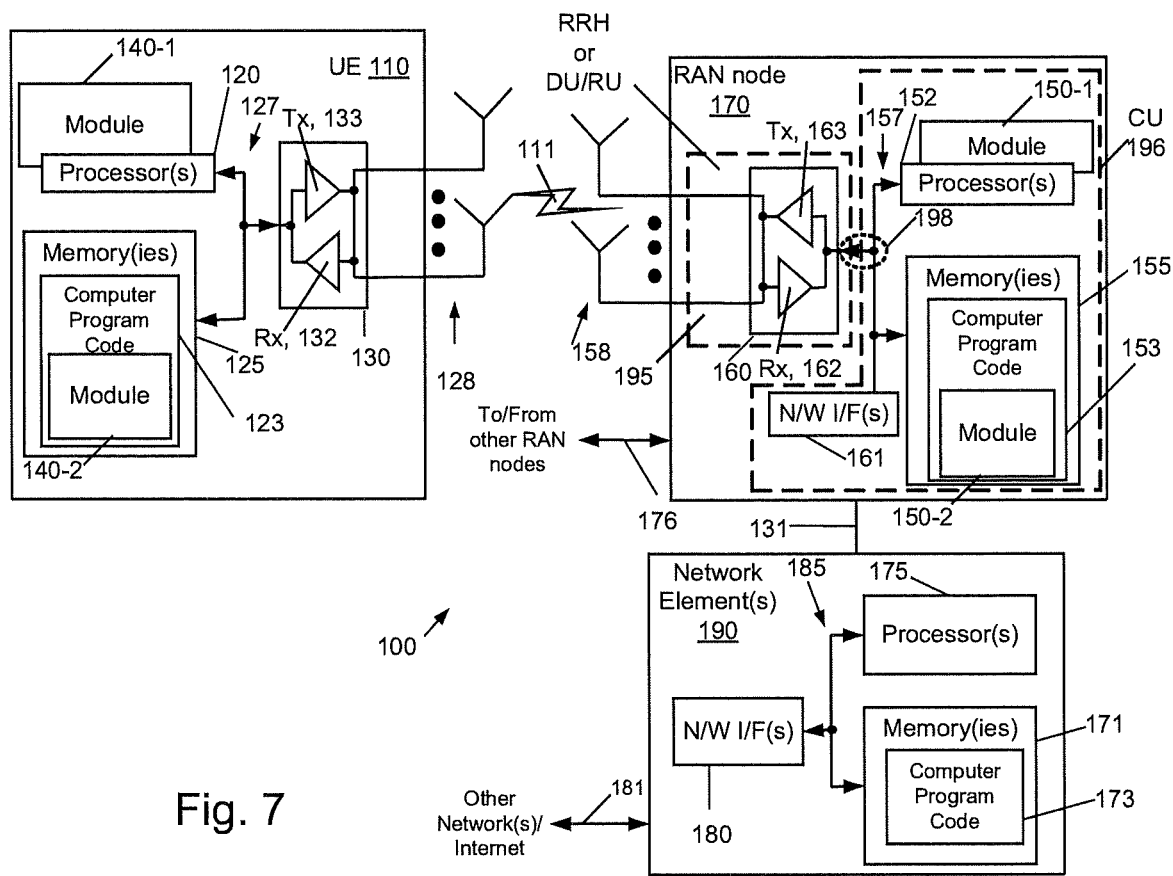
FIG. 7 shows a block diagram of one possible and non-limiting example in which the examples may be practiced.

FIG. 7 shows a block diagram of one possible and non-limiting example in which the examples may be practiced. A user equipment (UE) 110, radio access network (RAN) node 170, and network element(s) 190 are illustrated. In the example of FIG. 7, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

A base station with which a user equipment is connected or camped on, may be called as a serving base station. In practical situations the serving base station and the camped on base station may change e.g. when the user equipment in moving, or if the signal strength from different base stations changes (e.g. signals from a neighbouring base station becomes stronger than signals from the currently serving base station.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

Figure 8:
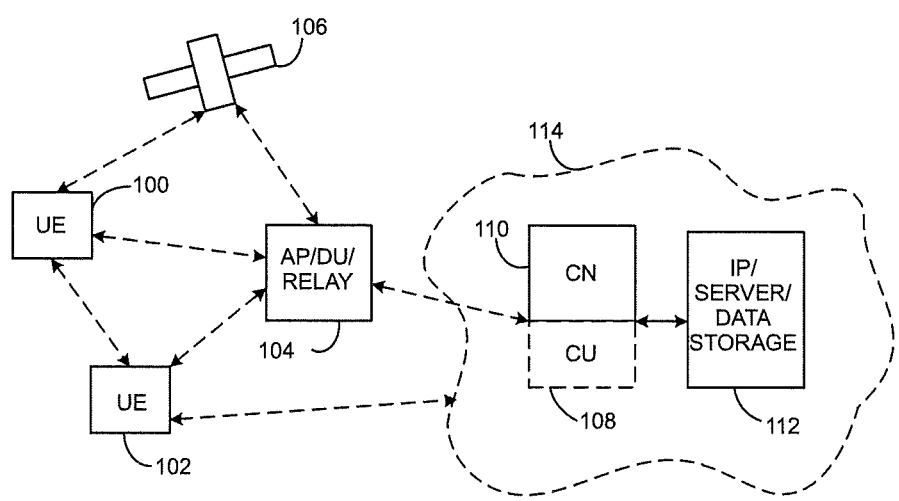
FIG. 8 shows a part of an exemplifying wireless communications access network in accordance with at least some embodiments.

FIG. 8 depicts examples of simplified system architectures showing some elements and functional entities, all being logical units, whose implementation may differ from what is shown. The connections shown in FIG. 8 are logical connections; the actual physical connections may be different. It is apparent to a person skilled in the art that the system typically comprises also other functions and structures than those shown in FIG. 8.

The embodiments are not, however, restricted to the system given as an example but a person skilled in the art may apply the solution to other communication systems provided with necessary properties.

The example of FIG. 8 shows a part of an exemplifying radio access network.

FIG. 8 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 8 by "cloud" 114). The communication system may also comprise a central control entity, or a like, providing facilities for networks of different operators to cooperate for example in spectrum sharing.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 7 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Additionally, although the apparatuses have been depicted as single entities, different units, processors and/or memory units (not all shown in FIG. 7) may be implemented.

In 5G systems a base station may have a MIMO antenna array comprising dozens of individual antenna elements. Signals to and from those antenna elements can be controlled e.g. by signal-processing algorithms so that a good transmission route may be utilized through air to each user equipment. Then the base stations can send individual data packets in many different directions (with different beams). Beamforming allows many users and antennas on such MIMO array to exchange much more information at once, For millimeter waves used in 5G networks, beamforming is primarily used to address a different set of problems: cellular signals are easily blocked by objects and tend to weaken over long distances, wherein beamforming may help by focusing a signal in a concentrated beam that points only in the direction of a user equipment rather than broadcasting in many directions at once. This approach may increase the probability that the signals arrive intact and may also reduce interference for everyone else.

Figure 9A:
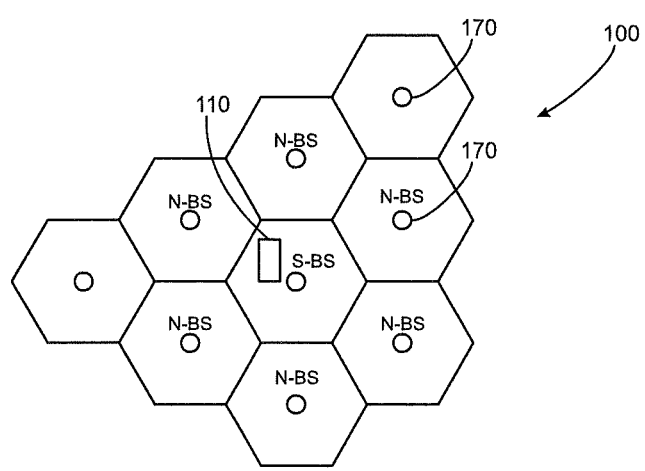
FIG. 9a illustrates a part of a wireless network having several base stations and an exemplary user equipment.

FIG. 9a illustrates a part of a wireless network 100 having several base stations 170 and an exemplary user equipment 110. In FIG. 9a it is assumed that the base station marked as S-BS is the serving base station, when the user equipment is in connected mode, and the base station where the user equipment is camped on when not in connected mode. Some of the neighbouring base stations are labelled as N-BS in FIG. 9a. In practical situations the serving base station and the camped on base station may change e.g. when the user equipment in moving, or if the signal strength from different base stations changes (e.g. signals from a neighbouring base station N-BS becomes stronger than signals from the currently serving base station.

Figure 9B:
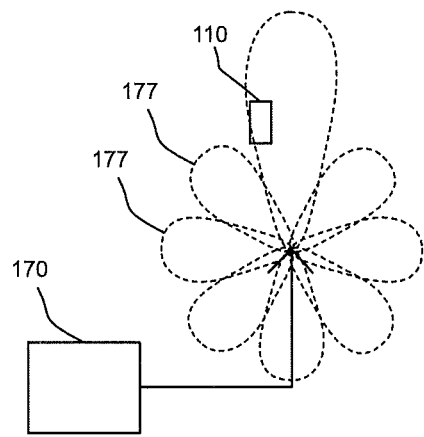
FIG. 9b illustrates in a simplified manner beams of a base station serving an exemplary user equipment.

The serving base station may have assigned one or more beams 177 (FIG. 9b) for the user equipment on the basis of some criteria. For example, that beam which is directed towards the location of the user equipment may be selected for the user equipment and if the user equipment moves to another location, another beam directed towards that new location may be selected instead. In FIG. 9b most of the beams are illustrated being similar to each other and one beam is illustrated to have stronger signal than the others but in practical implementations different beams may have different parameters such as signal strength, width length etc. It should also be noted that the beams depicted in FIG. 9b are only illustrative but in reality the beams may have different forms and sizes.

A base station may have a spatial beam codebook which includes information of beams available by a base station, wherein the base station may control which of the available beams shall be used during transmission and/or reception.

Similarly, a UE may also have a MIMO antenna array having a plurality of individual antenna elements, wherein the UE may control which of the available beams shall be used during transmission and/or reception.

A spatial beam codebook, or shortly a codebook, may be defined as follows, for example.

A spatial beam codebook of size $N_B$ and whose elements are indexed by b is defined, wherein b=1, 2, . . . , $N_B$. Each spatial beam (worded as beam henceforth) corresponds to a radiation pattern whose main lobe is uniquely directed to an angular direction with respect to the antenna array broadside in both the azimuth (i.e. horizontal) and zenith (i.e. vertical) planes. The angular direction for the bth beam may be denoted as $(h_b, v_b)$ where $h_b$ and $v_b$ are horizontal angles and vertical angles of the bth beam, respectively.

Transmission and reception beamforming may be performed e.g. by adjusting phase angles and/or delays of individual signal paths of the transmitter and/or receiver. In the following, the transmitter related beamforming is described in more detail.

Figure 10A:
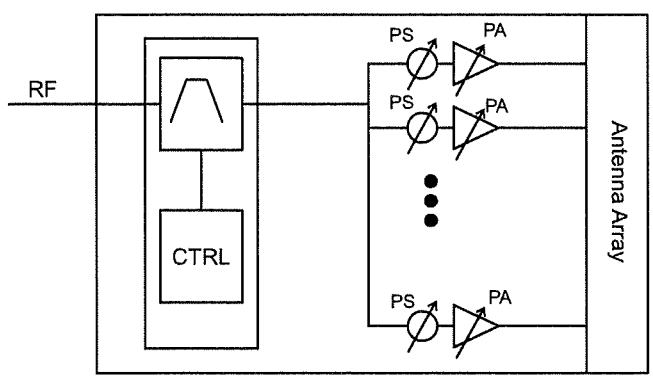
FIG. 10a illustrates an example of a transmitter RF front end of a user equipment.

FIG. 10a illustrates an example of a transmitter RF front end of a user equipment. Signals to be transmitted are provided to an input RF/IF as radio frequency (RF) signals or as intermediate frequency (IF) signals. Control information is provided to a control input CTRL. The RF front end comprises a filter F such as a low-pass filter to filter out frequencies which are above a certain limit. This kind of filtering may filter out e.g. harmonic components of the input signals. A splitter S divides the input signal to several paths. The number of paths is equal to the number of beams $N_B$, for example. Each path has a phase shifter PS and a power amplifier PA. The phase shifter produces a delay to the signal and the power amplifier PA amplifies the output signal from the phase shifter. The power noise amplifiers are coupled to elements of the antenna array ANT. The RF front end can direct the beams by adjusting the delays of the phase shifters PS and the amplification of the power amplifiers PA. The codebook comprises indexed information of the delays and amplifications for each phase shifter and power amplifier, respectfully, so that each index (codebook entry) is associated with information to be used to obtain a certain radiation pattern (i.e. beam). For example. the codebook index 1 may contain phase delays and amplification factors for a beam 1 directed to a first direction, the codebook index 2 may contain phase delays and amplification factors for a beam 2 directed to a second direction, . . . , and the codebook index N may contain phase delays and amplification factors for a beam N directed to an $N^{th}$ direction.

Figure 10B:
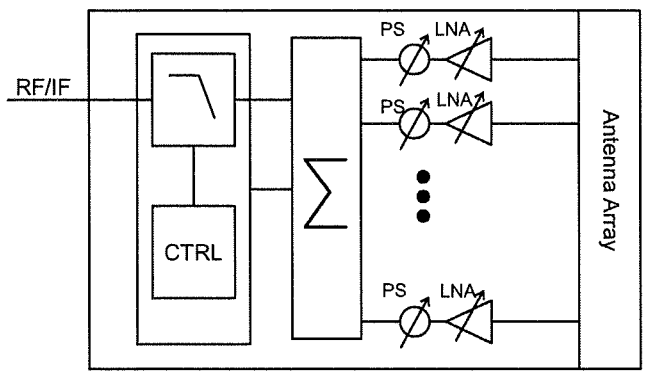
FIG. 10b illustrates an example of a reception RF front end of a user equipment.

FIG. 10b illustrates an example of a reception RF front end of a user equipment. Signal received by elements of an antenna array are provided to ow-noise amplifiers LNA which amplify the received signals by an amplification factor. The amplified signals are provided to phase shifters PS to induce delay to the received, amplified signals. The delayed signals are combined by a summing element S to produce a reconstructed signal for further processing. an input RF/IF as radio frequency (RF) signals or as intermediate frequency (IF) signals. The RF front end also comprises a filter F such as a low-pass filter to filter out frequencies from the reconstructed signal which are above a certain limit. The RF front end can direct the reception beams by adjusting the delays of the phase shifters PS and the amplification of the low-noise amplifiers LNA. As was explained above in connection with the transmitter RF front end, the codebook comprises indexed information of the delays and amplifications for each phase shifter and low-noise amplifier, respectfully, so that each index is associated with information to be used to obtain a certain radiation pattern (i.e. beam). For example. the codebook index 1 may contain phase delays and amplification factors for a beam 1 directed to a first direction, the codebook index 2 may contain phase delays and amplification factors for a beam 2 directed to a second direction, . . . , and the codebook index N may contain phase delays and amplification factors for a beam N directed to an $N^{th}$ direction.

Figure 10C:
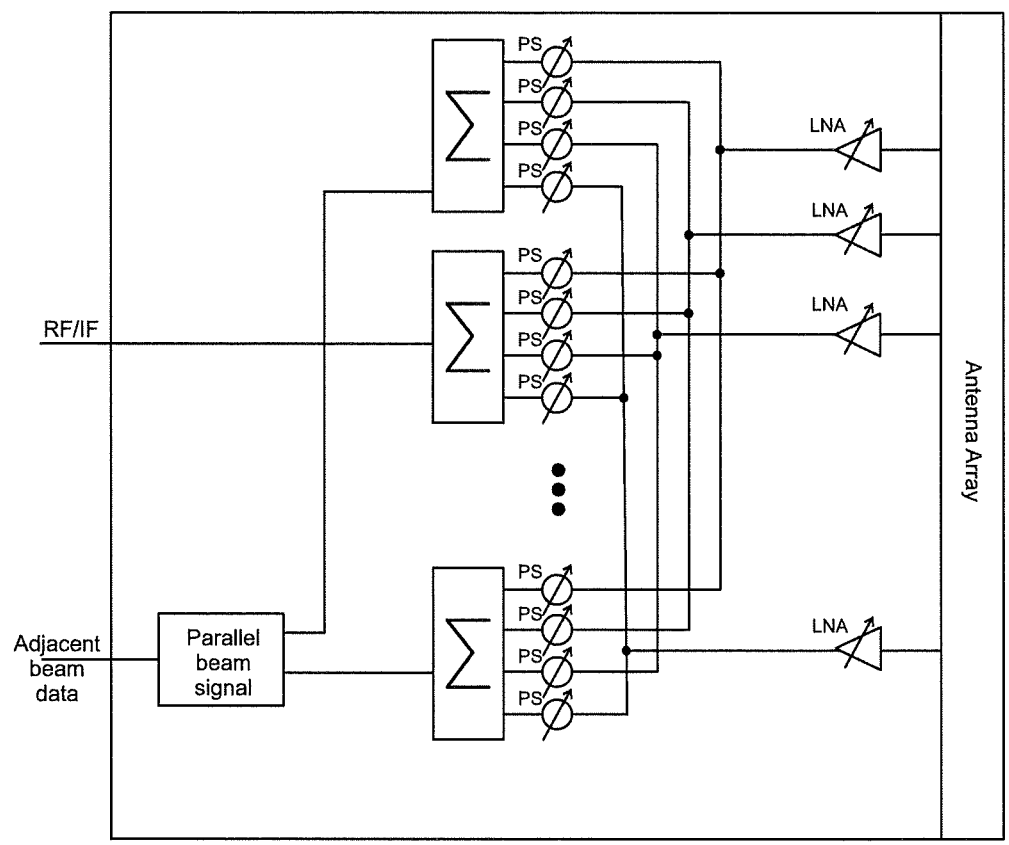
FIG. 10c illustrates an example of another reception RF front end of a user equipment.

FIG. 10c illustrates an example of another reception RF front end of a user equipment. In this example, there is a plurality of phase shifters and summing elements so that more than one reception beam can be utilized simultaneously i.e. in parallel. For example, there are three groups of phase shifters and summing elements, wherein the receiver RF front end is able to simultaneously receive signals from three different beams. In accordance with an embodiment, the beams may be three adjacent beams. Hence, the user equipment may be able to analyze signal conditions in the environment faster than if only one reception chain were in use.

It should be noted that, for clarity, FIGS. 10a, 10b and 10c show only some operational blocks of the RF front ends but in practical implementations there are also other operational blocks such as mixers etc. Furthermore, although the transmission RF front end and the reception RF front end are depicted separately, they may be implemented as one circuitry and some components may be common for both RF front ends.

Figure 12A:
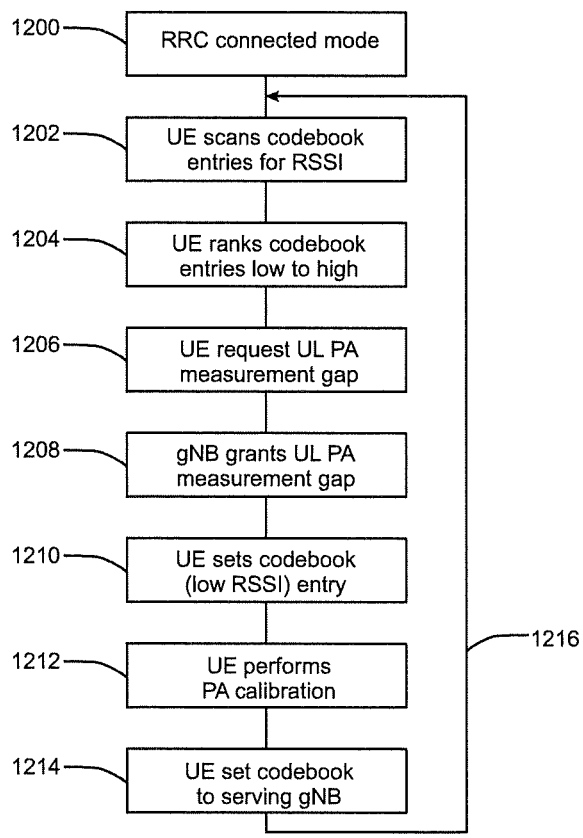
FIG. 12a is a flow diagram of a method, in accordance with an embodiment.

In the following, the operation of the user equipment 110 when determining an appropriate beam or a set of beams for calibration purposes will described in more detail with reference to the flow diagram of FIG. 12a.

The user equipment 110 selects a first codebook entry to select a reception beam and starts measurement of the received signal(s) to obtain information related to received signal strength via the selected reception beam. This information may be a Received Signal Strength Indicator (RSSI), where RSSI is the total received power including noise and interference. The user equipment 110 scans through 1202 all the available codebook entries (i.e. the available reception beams), obtains the measurement result and stores the measurement results to a memory. When each codebook entry has been processed and the corresponding signal strength measured, the user equipment 110 orders (ranks) 1204 the codebook entries to an order of the signal strength from lowest to highest (or the other way round). The user equipment 110 obtains timing information for a measurement slot for calibration e.g. by sending measurement resources request 1206 to the gNB. The gNB may grant 1208 the measurement slot and send information of the granted measurement resources to the user equipment 110. The granted measurement slot, as part of the measurement resources, for calibration may also be called as a calibration gap in this disclosure. The user equipment 110 selects 1210 that codebook entry which was showing the lowest signal strength in the scanning and ranking procedure. Thus, the delays of the phase shifters PS and amplifications of the power amplifiers of the transmission RF end are set according to the parameters indicated by the selected codebook entry.

Then, the user equipment 110 performs the calibration 1212 by setting the amplification of the transmission RF front end to a maximum and transmitting a measurement signal via the selected beam in the transmission slot. The user equipment 110 receives the transmitted signal by another MIMO branch and performs calibration. This way, the user equipment 110 may deduce how the operation of a pre-distorter 1302 (FIG. 13) of the power amplifier should be adjusted to improve the linearity, for example.

During or as a result of the calibration the user equipment 110 may store e.g. calibrated coefficients to a coefficient memory 1304 (FIG. 13) to be used when adjusting the pre-distorter to compensate non-linearities of the power amplifier.

Figure 11A:
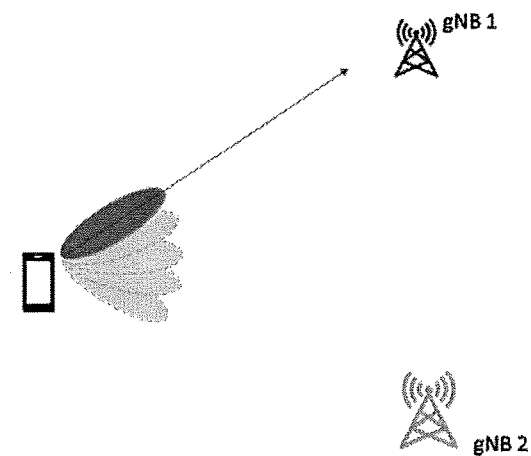
FIG. 11a illustrates an example of a user equipment communicating with a base station.

After the calibration procedure has been performed, the user equipment 110 may select 1214 that codebook entry which corresponds with the beam to be used in communication with the serving gNB of the user equipment 110. FIG. 11a illustrates an example of the user equipment UE 1 communicating with the base station gNB.

The above calibration procedure may be repeated 1216 at intervals or when determined by the user equipment 110 or instructed by the gNB, for example.

In accordance with an embodiment of the disclosure, the user equipment 110 may receive from the serving gNB indication of repetitive measurement slots, wherein the user equipment 110 may repeatedly perform the calibration operation at the time instances of the measurement slots.

Figure 12B:
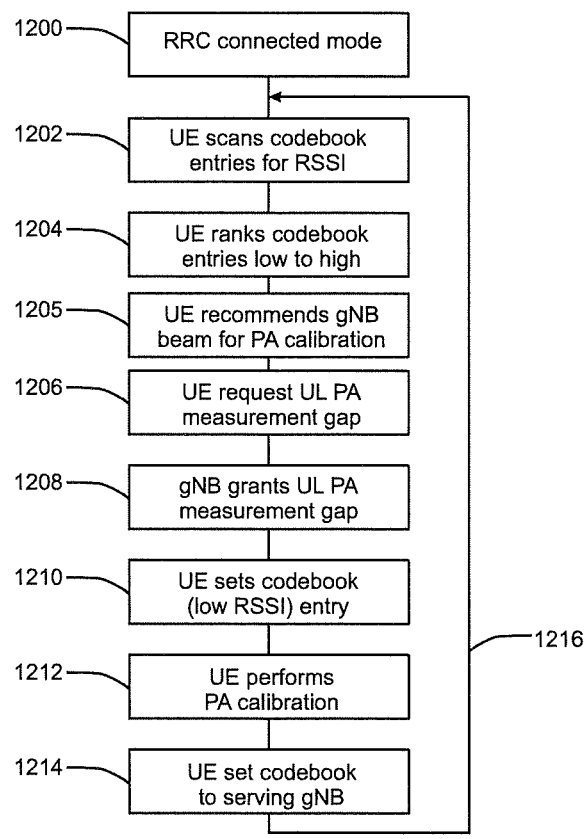
FIG. 12b is a flow diagram of a method, in accordance with another embodiment.

FIG. 12b illustrates another embodiment of the disclosure for calibration of the pre-distorter 1302 for the power amplifier PA of the user equipment. The pre-distorter 1302 may also be called as a digital pre-distorter 1302 when it operates in baseband based on digital data. A pre-distorter operating with analogue IF or RF signals may be called as an analog pre-distorter. The embodiment of FIG. 12b differs from the embodiment of FIG. 12a so that after ordering 1204 the codebook entries according to measured signal strengths, the user equipment 110 sends 1205 to the gNB a recommended beam or beams for self-calibration of the user equipment 110 so that the gNB would be able to indicate the right beam to use for the self-calibration transmission. The gNB may have some additional information which may be used in selecting the most appropriate codebook entry. For example, if the user equipment 110 indicated two or even more alternative codebook entries, the gNB may examine which one of the indicated codebook entries would be the most appropriate codebook entry for the calibration procedure.

Indication of the right codebook entry by the gNB may be provided, for example, through a Medium Access Control-Control Element (MAC-CE) or a downlink control information (DCI) message. The Medium Access Control-Control Element (MAC-CE) message may be carried by a Physical Downlink Shared Channel (PDSCH). The downlink control information message may be carried by a Physical Downlink Control Channel (PDCCH). DCI contains the scheduling information for the UL or DL data channels and other control information for one UE or a group of UEs.

Figure 11B:
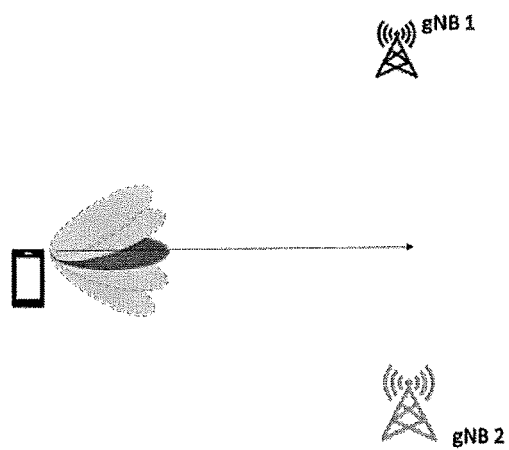
FIG. 11b illustrates an example of a situation in which the user equipment sends a calibration signal to a direction in which least disturbance might occur based on results of interference scanning in the surrounding of the user equipment, in accordance with an embodiment.

The procedure presented above may minimize or at least reduce interference and blockage done in the system as the user equipment 110, when performing the calibration, transmits in the direction of least interference, possibly away from the gNB. In other words, the interference in the surrounding is scanned after which the calibration signal may be sent to a direction in which least disturbance might occur. An example of this is illustrated in FIG. 11b in which the beam selected for the calibration is that beam which is directed approximately in the middle of the imaginary line between the first base station gNB 1 and the second base station gNB 2.

The signal transmitted by the user equipment 110 is captured by the user equipment 110 itself using a different MIMO branch in the near field, thus the directivity of the signal is not important in the scope of self-calibration.

The transmitted signal captured by the user equipment 110 is the near field signal, therefore the setting of the phase shifters will have no impact on the useful signal for self-calibration. However the far field signal may minimize any interference in the network.

In accordance with an embodiment of the disclosure the same calibration gap could be granted for several user equipment or each user equipment is granted a unique calibration gap.

In accordance with an embodiment of the disclosure, the user equipment 110 may not need to determine the weakest signal strength but a threshold may be determined or indicated wherein in the ordering phase 1204 the user equipment may compare the measured signal strengths with the threshold and select one of the codebook entries which produced signal strength below the threshold.

In accordance with an embodiment of the disclosure, the user equipment 110 may already utilize the threshold in the scanning phase 1202 so that if a measurement indicates that the signal strength corresponding to the current codebook entry is below the threshold, the scanning 1202 can be interrupted and the current codebook entry could be selected for the calibration.

Figure 13:
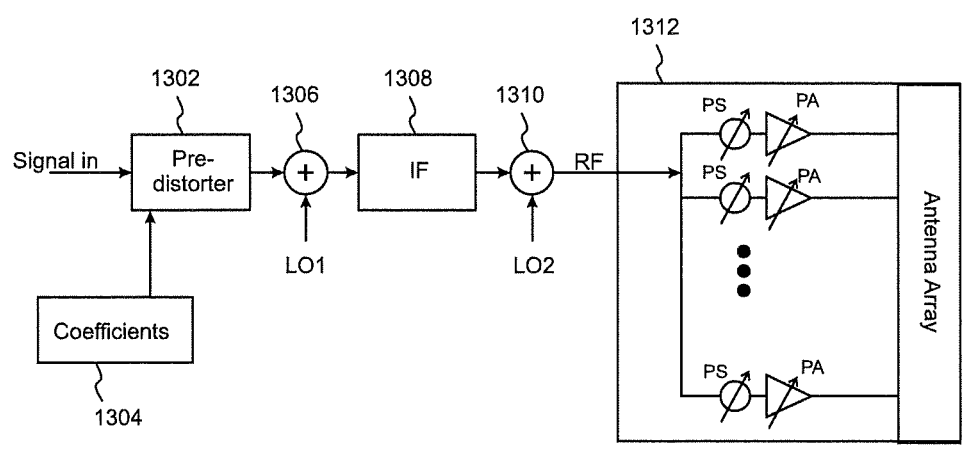
FIG. 13 illustrates some elements of the pre-distortion-power amplifier chain as a greatly simplified block diagram, in accordance with an embodiment.

With respect to FIG. 13, some elements of the pre-distortion-power amplifier chain are illustrated as a greatly simplified block diagram, in accordance with an embodiment. A signal to be transmitted (a base band signal) is entered to the pre-distorter 1302 which performs the de-linearization of the signal based on calibrated coefficients previously stored into the coefficient memory 1304. The modified signal is upconverted by a first upconverter 1306 to an intermediate frequency determined by a first local oscillator frequency LO1. The intermediate frequency signal may be processed in the intermediate signal block 1308 and provided further to a second upconverter 1310 to a radio frequency signal determined by a second local oscillator frequency LO2. At the output of the second upconverter 1310 the RF signal is provided to the power amplifier stage 1312 where the selected codebook entry is used to adjust phase delays of the phase shifters PS and amplification coefficients of the power amplifiers PA.

It should be noted that the base band signal may be directly converted to the RF signal wherein the IF parts 1306 and 1308 are not needed.

Figure 14:
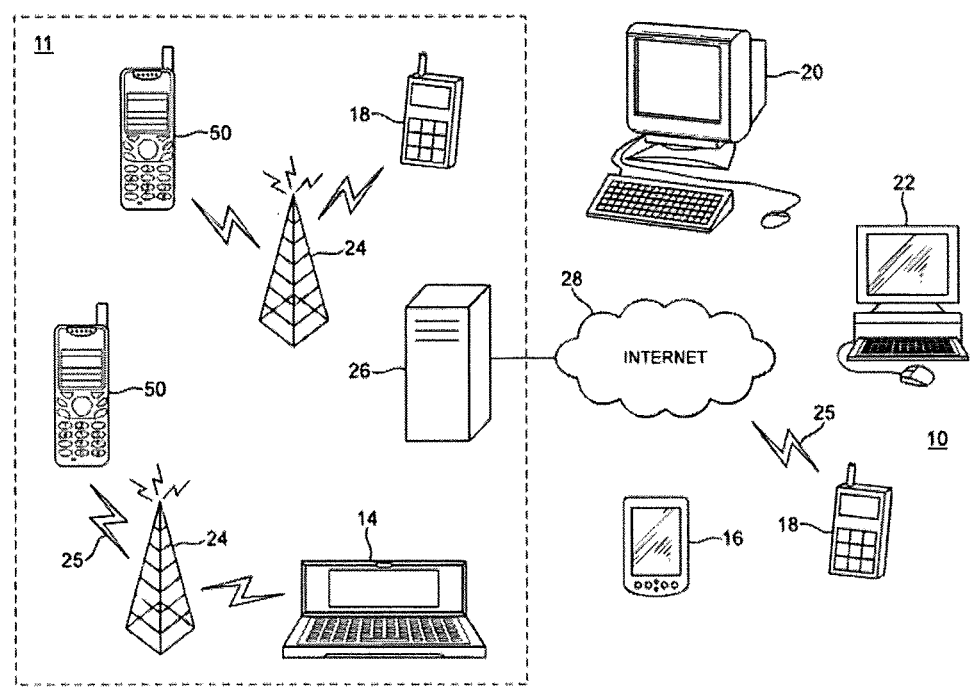
FIG. 14 illustrates an example of a system within which embodiments of the disclosure can be utilized.

With respect to FIG. 14, an example of a system within which embodiments of the disclosure can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 14 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE), 5G and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

In accordance with at least some examples the communications of the communications devices may comprise uplink transmissions and/or downlink transmissions of data. The uplink transmissions may be performed from a wireless device to the wireless communication system, e.g. an access node, and the downlink transmissions may be performed from the wireless communication system, e.g. an access node, to the wireless device. The uplink transmissions may be performed on an uplink shared channel, e.g. a Physical Uplink Shared Channel (PUSCH). The PUSCH may be transmitted by the wireless device on the basis of a grant received on a downlink control channel, e.g. a Physical Downlink control Channel (PDCCH). The downlink transmissions may be performed on a downlink shared channel, e.g. a Physical Downlink Shared Channel (PDSCH). Release 15 specifications of the 3GPP may be referred to for examples PUSCH and PDSCH procedures.

The downlink and uplink transmissions may be organized into frames, e.g. a radio frame. In an example, each frame may be of 10 ms duration and divided into subframes of 1 ms duration. Each subframe may be further divided into multiple Orthogonal Frequency Division-Multiplexing (OFDM) symbols. The OFDM symbols may be arranged to slots within each subframe. In an example, the radio frame may include 10 subframes. One subframe may include two consecutive slots of 14 symbols with 30 kHz sub-carrier spacing. Accordingly, the radio frame may in total include 20 slots.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
 (a) hardware-only circuit implementations (such as implementations in only analogue and/or digital circuitry) and
 (b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples of the disclosure will be described.

In accordance with an embodiment there is provided a method comprising:
  measuring strength of signals received via a plurality of beams of one or more antenna arrays of a user equipment;
  ordering the beams on the basis of the measurement strengths;
  selecting from the ordered beams at least one beam for calibration of a pre-distorter of a power amplifier of the user equipment;
  obtaining information of available measurement resources for the calibration;
  transmitting a calibration signal by the power amplifier using the selected beam at the time of the available measurement slot;
  receiving the calibration signal by another radio frequency chain of the antenna array which is not used in the transmission of the calibration signal;
  obtaining calibration information on the basis of the transmitted calibration signal and the received calibration signal; and
  calibrating the pre-distorter based on the calibration information.

In accordance with an embodiment of the method the beam corresponding to a lowest signal strength is selected.

In accordance with an embodiment of the method the beam having signal strength below a threshold is selected.

In accordance with an embodiment of the method the threshold value is received from a base station of a communication network.

In accordance with an embodiment of the method the threshold is indicated as a value of a received signal strength indicator, wherein strength of the received calibration signal is measured to obtain received signal strength indicator.

In accordance with an embodiment of the method one or more recommended beams for calibration are indicated to a base station of a communication network.

In accordance with an embodiment of the method information of a set of beams to be scanned is received from a base station of a communication network, wherein only measure signal strengths of beams of the indicted set of beams are measured.

In accordance with an embodiment of the method the measurement resources are requested by the user equipment from a base station of a communication network.

In accordance with an embodiment of the method the signal strength information is obtained from a received signal strength indicator.

In accordance with an embodiment of the method measure signal strength of all beams of the antenna array or only signal strength of a subset of all beams of the antenna array are measured.

In accordance with an embodiment of the method one or more coefficients of the pre-distorter are adjusted.

In accordance with an embodiment of the disclosure there is provided an apparatus comprising at least one processor; and at least one memory including computer program code the at least one memory and the computer program code configured to, with the at least one processor, cause the apparatus to perform at least the following:
  measure strength of signals received via a plurality of beams of one or more antenna arrays of a user equipment;
  order the beams on the basis of the measurement strengths;
  select from the ordered beams at least one beam for calibration of a pre-distorter for a power amplifier of the user equipment;
  obtain information of available measurement resources for the calibration;
  transmit a calibration signal by the power amplifier using the selected beam at the time of the available measurement resources;
  receive the calibration signal by another radio frequency chain of the antenna array which is not used in the transmission of the calibration signal;
  obtain calibration information on the basis of the transmitted calibration signal and the received calibration signal; and
  calibrate the pre-distorter based on the calibration information.

In accordance with an embodiment of the apparatus said at least one memory including computer program code configured to, with the at least one processor, cause the apparatus to:
  select the beam corresponding to a lowest signal strength.

In accordance with an embodiment of the apparatus said at least one memory including computer program code configured to, with the at least one processor, cause the apparatus to:
  select the beam having signal strength below a threshold.

In accordance with an embodiment of the apparatus said at least one memory including computer program code configured to, with the at least one processor, cause the apparatus to:
  receive the threshold value from a base station of a communication network.

In accordance with an embodiment of the apparatus the threshold is indicated as a value of a received signal strength indicator, wherein said at least one memory including computer program code configured to, with the at least one processor, cause the apparatus to:
  measure the strength of the received calibration signal to obtain received signal strength indicator.

In accordance with an embodiment of the apparatus said at least one memory including computer program code configured to, with the at least one processor, cause the apparatus to:

indicate one or more recommended beams for calibration to a base station of a communication network.

In accordance with an embodiment of the apparatus said at least one memory including computer program code configured to, with the at least one processor, cause the apparatus to:

receive information of a set of beams to be scanned from a base station of a communication network; and measure only signal strengths of beams of the indicted set of beams.

In accordance with an embodiment of the apparatus said at least one memory including computer program code configured to, with the at least one processor, cause the apparatus to:

request the measurement resources from a base station of a communication network.

In accordance with an embodiment of the apparatus said at least one memory including computer program code configured to, with the at least one processor, cause the apparatus to:

obtain the signal strength information from a received signal strength indicator.

In accordance with an embodiment of the apparatus said at least one memory including computer program code configured to, with the at least one processor, cause the apparatus to:

measure signal strength of all beams of the antenna array or only signal strength of a subset of all beams of the antenna array.

In accordance with an embodiment of the apparatus said at least one memory including computer program code configured to, with the at least one processor, cause the apparatus to:

adjust one or more coefficients of the pre-distorter.

In the following, a list of some abbreviations used in this disclosure are provided:

3GPP Third Generation Partnership Project
A/D Analogue-to-Digital
AM Amplitude Modulation
DCI Downlink Control Information
DL Downlink
DPD Digital Pre-Distortion concept
FR2 Frequency Range 2
gNB Next Generation NodeB (a base transceiver station)
IDLA Indirect Learning Architecture
LTE Long Term Evolution
LUT Look-Up Table
MAC Medium Access Control
MIMO Multiple Input-Multiple Output
NR New Radio
PA Power amplifier
PBCH Physical Broadcast Channel
PM Pulse Modulation
PDSCH Physical Downlink Shared Channel
PDCCH Physical Downlink Control Channel
PUCCH Physical Uplink Control Channel
PUSCH Physical Uplink Shared Channel
RF Radio Frequency
RRC Radio Resource Control
RSRP Reference Signal Received Power
RSSI Received Signal Strength Indication
RX Receive
SS Synchronization Signal
SSB Synchronization Signal Block, SS/PBCH Block
TCI Transmission Configuration Indication
TX Transmit
UE User equipment
UL Uplink

The invention claimed is:

1. An apparatus comprising:

at least one processor; and at least one memory including computer program code, the at least one memory and the computer program code configured to, with the at least one processor, cause the apparatus to perform at least the following:

measure strength of signals received via a plurality of beams of one or more antenna arrays of the apparatus;

order the beams on the basis of the measurement strengths;

select from the ordered beams at least one beam for calibration of a pre-distorter for a power amplifier of the apparatus;

determine information of available measurement resources for the calibration;

transmit a calibration signal by the power amplifier using the selected beam at the time of the available measurement resources;

receive the calibration signal by another radio frequency chain of the antenna array which is not used in the transmission of the calibration signal;

determine calibration information on the basis of the transmitted calibration signal and the received calibration signal; and calibrate the pre-distorter based on the calibration information.

2. The apparatus according to claim 1, wherein the at least one memory and the computer program code are configured to, with the at least one processor, cause the apparatus to select the beam corresponding to a lowest signal strength.

3. The apparatus according to claim 1 where the at least one memory and the computer program code are configured to, with the at least one processor, cause the apparatus to select the beam having signal strength below a threshold value.

4. The apparatus according to claim 3 where the at least one memory and the computer program code are configured to, with the at least one processor, cause the apparatus to perform receiving from a base station of a communication network information on the threshold value.

5. The apparatus according to claim 3, wherein the threshold value is indicated as a value of a received signal strength indicator, where the at least one memory and the computer program code are configured to, with the at least one processor, cause the apparatus to perform comparing the received signal strength indicator with the threshold value to determine whether the signal strength is below the threshold value.

6. The apparatus according to claim 1 where the at least one memory and the computer program code are configured to, with the at least one processor, cause the apparatus to perform indicating to a base station of a communication network one or more recommended beams for calibration.

7. The apparatus according to claim 1 where the at least one memory and the computer program code are configured to, with the at least one processor, cause the apparatus to perform:

receiving from a base station of a communication network information of a set of beams to be scanned; and only measure signal strengths of beams of the set of beams.

8. The apparatus according to claim 1, where the at least one memory and the computer program code are configured to, with the at least one processor, cause the apparatus to perform:
   requesting the measurement resources from a base station of a communication network; and
   receiving from the base station information of the measurement resources.

9. The apparatus according to claim 1, wherein the at least one memory and the computer program code are configured to, with the at least one processor, cause the apparatus to store information of available measurement resources in the apparatus.

10. The apparatus according to claim 1, where the at least one memory and the computer program code are configured to, with the at least one processor, cause the apparatus to perform:
    determining the signal strength information from a received signal strength indicator.

11. The apparatus according to claim 1, where the at least one memory and the computer program code are configured to, with the at least one processor, cause the apparatus to perform at least one of:
    measure signal strength of all beams of the antenna array; or
    measure signal strength of a subset of all beams of the antenna array.

12. The apparatus according to claim 1, where the at least one memory and the computer program code are configured to, with the at least one processor, cause the apparatus to:
    adjust one or more coefficients of the pre-distorter.

13. A method comprising:
    measuring strength of signals received via a plurality of beams of one or more antenna arrays of a user equipment;
    ordering the beams on the basis of the measurement strengths;
    selecting from the ordered beams at least one beam for calibration of a pre-distorter of a power amplifier of the user equipment;
    determining information of available measurement resources for the calibration;
    transmitting a calibration signal by the power amplifier using the selected beam at the time of the available measurement slot;
    receiving the calibration signal by another radio frequency chain of the antenna array which is not used in the transmission of the calibration signal;
    determining calibration information on the basis of the transmitted calibration signal and the received calibration signal; and
    calibrating the pre-distorter based on the calibration information.

14. A non-transitory program storage device readable by an apparatus, tangibly embodying a program of instructions executable by the apparatus for performing operations, the operations comprising:
    measuring strength of signals received via a plurality of beams of one or more antenna arrays of the apparatus;
    ordering the beams on the basis of the measurement strengths;
    selecting from the ordered beams at least one beam for calibration of a pre-distorter of a power amplifier of the apparatus;
    determining information of available measurement resources for the calibration;
    transmitting a calibration signal by the power amplifier using the selected beam at the time of the available measurement slot;
    receiving the calibration signal by another radio frequency chain of the antenna array which is not used in the transmission of the calibration signal;
    determining calibration information on the basis of the transmitted calibration signal and the received calibration signal; and
    calibrating the pre-distorter based on the calibration information.

15. The non-transitory program storage device as claimed in claim 14 where the operations comprise selecting the beam corresponding to a lowest signal strength.

16. The non-transitory program storage device as claimed in claim 14 where the operations comprise selecting the beam having signal strength below a threshold value.

17. The non-transitory program storage device as claimed in claim 14 where the operations comprise indicating to a base station of a communication network one or more recommended beams for calibration.

18. The non-transitory program storage device as claimed in claim 14 where the operations comprise:
    receiving from a base station of a communication network information of a set of beams to be scanned; and
    to only measure signal strengths of beams of the set of beams.

19. The non-transitory program storage device as claimed in claim 14 where the operations comprise storing information of available measurement resources in the apparatus.

20. The non-transitory program storage device as claimed in claim 14 where the operations comprise determining the signal strength information from a received signal strength indicator.

* * * * *